United States Patent
Azcona et al.

(10) Patent No.: US 7,349,918 B2
(45) Date of Patent: Mar. 25, 2008

(54) METHOD AND SYSTEM FOR SEARCHING BINARY FILES

(75) Inventors: Luis Azcona, Phoenix, AZ (US); Melinda K. Pollock, Fountain Hills, AZ (US); Robert A. Sorensen, Scottsdale, AZ (US); Art Tramutolo, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 285 days.

(21) Appl. No.: 10/611,509

(22) Filed: Jun. 30, 2003

(65) Prior Publication Data

US 2004/0267775 A1 Dec. 30, 2004

(51) Int. Cl.
*G06F 17/00* (2006.01)

(52) U.S. Cl. .............. 707/102; 707/3; 707/4; 707/101; 707/103 Y; 707/104.1

(58) Field of Classification Search ......... 707/1–3, 707/5, 102, 104.1, 101, 10, 103 R, 4, 103 Y; 704/9; 713/186
See application file for complete search history.

(56) References Cited

U.S. PATENT DOCUMENTS

| | | | |
|---|---|---|---|
| 5,729,741 A * | 3/1998 | Liaguno et al. ........ 707/104.1 |
| 5,778,359 A * | 7/1998 | Stent ..................... 707/4 |
| 5,799,310 A * | 8/1998 | Anderson et al. ........ 707/102 |
| 5,818,978 A * | 10/1998 | Al-Hussein .......... 382/296 |
| 5,884,304 A * | 3/1999 | Davis et al. .............. 707/4 |
| 5,892,843 A * | 4/1999 | Zhou et al. ............ 382/176 |
| 5,893,087 A * | 4/1999 | Wlaschin et al. ......... 707/3 |
| 5,896,462 A * | 4/1999 | Stern ................... 382/306 |
| 6,026,397 A * | 2/2000 | Sheppard ................ 707/5 |
| 6,047,291 A * | 4/2000 | Anderson et al. .... 707/103 R |
| 6,070,160 A * | 5/2000 | Geary .................... 707/4 |
| 6,078,925 A * | 6/2000 | Anderson et al. .... 707/103 R |
| 6,108,669 A * | 8/2000 | Dalenberg et al. ..... 707/203 |
| 6,202,070 B1 * | 3/2001 | Nguyen et al. ....... 707/104.1 |
| 6,212,494 B1 * | 4/2001 | Boguraev ................ 704/9 |
| 6,292,802 B1 * | 9/2001 | Kessenich et al. ..... 707/101 |
| 6,324,547 B1 * | 11/2001 | Lennert et al. ........ 707/204 |
| 6,741,988 B1 * | 5/2004 | Wakefield et al. ........ 707/7 |
| 6,990,445 B2 * | 1/2006 | Ky ..................... 704/235 |
| 2002/0156767 A1 * | 10/2002 | Costa et al. .............. 707/1 |
| 2002/0165879 A1 * | 11/2002 | Dreyband et al. ....... 707/513 |
| 2002/0169746 A1 * | 11/2002 | Cowman et al. ......... 707/1 |
| 2003/0033275 A1 * | 2/2003 | Alpha et al. ............. 707/1 |

(Continued)

OTHER PUBLICATIONS

Snarker.net, "Text-to-Binary Converter", 2000, 2001, Snarkers.*

(Continued)

*Primary Examiner*—Thuy N. Pardo
(74) *Attorney, Agent, or Firm*—Snell & Wilmer L.L.P.

(57) ABSTRACT

In the past, it has not been possible to perform searches within documents stored in a proprietary, binary format, such as Microsoft Word documents and Adobe Acrobat documents. The present invention solves the problem by storing the binary file as a field in a record of the database. Then, the binary file is translated into a text format, which is searchable within the database. Thereafter, a user of the database is able to search within binary files by performing a search of the translated file.

8 Claims, 3 Drawing Sheets

U.S. PATENT DOCUMENTS

| | | |
|---|---|---|
| 2003/0130843 A1* | 7/2003 | Ky .............................. 704/235 |
| 2003/0177443 A1* | 9/2003 | Schnelle et al. ............ 715/513 |
| 2003/0204500 A1* | 10/2003 | Delpech ........................ 707/3 |
| 2004/0010419 A1* | 1/2004 | Sinnott .......................... 705/2 |
| 2004/0025030 A1* | 2/2004 | Corbett-Clark et al. ..... 713/186 |
| 2004/0151377 A1* | 8/2004 | Boose et al. ................ 382/193 |
| 2004/0199516 A1* | 10/2004 | Thames et al. ............. 707/100 |
| 2004/0268235 A1* | 12/2004 | Wason ........................ 715/513 |
| 2006/0080308 A1* | 4/2006 | Carpentier et al. ............ 707/3 |

OTHER PUBLICATIONS

Grooves, "My Play Ground >> Binary Conversion", Mar. 2003.*

* cited by examiner

METHOD AND SYSTEM FOR SEARCHING BINARY FILES

FIELD OF INVENTION

This application generally relates to a computer database, and more particularly, to a method and system for facilitating full-text searching of binary files.

BACKGROUND OF THE INVENTION

A database is a collection of information that is stored in such a way that a computer program can quickly find desired data. Databases are used for many purposes throughout the world such as, for example, to store information regarding financial accounts, contact information, parts for specific products, court cases, and a multitude of other different uses. It is sometimes desirable to have a database that is accessible by many people at once such that multiple people can access data simultaneously. With the growth of the Internet, it has also become desirable for people in remote locations to be able to access data.

One problem with prior art databases is that, for a database to be used on a global basis, it was often necessary to create a "local copy" of the database in the remote location. For example, a database system may be stored in New York. However, it is desirable to have the database system accessed by people in London, England. Accessing a database on a global basis often becomes slow. Therefore, databases of the prior art relied on a local copy of the database being used in England and other sites that are far from the location of the database. Some globally used databases required the use of multiple local copies because of the number of users in different areas of the world. The local copy is periodically synchronized such that the information in the local database is the same as the information in the master database. However, between synchronizations, the data in the local database may be different than data in the master database. Such a situation may occur when either the master database is changed or when the local database is changed. Because certain databases contain very important information that can be changed by certain users, it is desirable to have a database that is accessible worldwide and does not incorporate the use of local databases.

One other problem with prior art databases is the lack of ability to search certain types of files. Databases typically contain records and fields. Fields contain individual pieces of information, such as a part number, or contact address, while a record is a complete set of fields. The various fields may be configured to store numeric information or text information, or a variety of other specialized types of information, such as date/time. Certain types of fields contain large amounts of text. Each of the fields can be searched to find records, wherein the fields meet certain criteria for the record request.

In certain instances, it is desirable to place existing information in a database for easy searching and access. However, the existing information may be in a proprietary binary format (i.e., a format that is computer-readable but not directly human-readable). Exemplary binary file formats include files created by Microsoft Word, WordPerfect, and Adobe Acrobat. In the prior art, it was not possible to perform a search on those types of binary files, as opposed to traditional files containing only text. It is desirable to have greater search capabilities of databases, including searching of binary files.

SUMMARY OF THE INVENTION

The present invention solves the problems in the prior art by providing for the searching of binary files. A binary file is placed in the database and the binary file is also processed such that the text information is extracted. The extracted text is then placed in another field of the database. A user is then able to search the extracted text. When the user wishes to access the information in the record, the user is able to open the binary file.

The present invention also provides a method for searching a database. Once a query is entered, a text field of the database is searched. The text field contains a text-only translation of a binary file. The results of the query are presented to the user such that a user is able to download or view the binary file, which is contained in the same database as the text-only translation.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS

The present invention may be described herein in terms of various functional components and various processing steps. It should be appreciated that such functional components may be realized by a variety of different hardware or structural components configured to perform the specified functions. For purposes of illustration only, exemplary embodiments of the present invention will be described herein. Further, it should be noted that, while various components may be suitably coupled or connected to other components, such connections and couplings may be realized by a direct connection between components, or by a connection through other components and devices.

Figure 1:
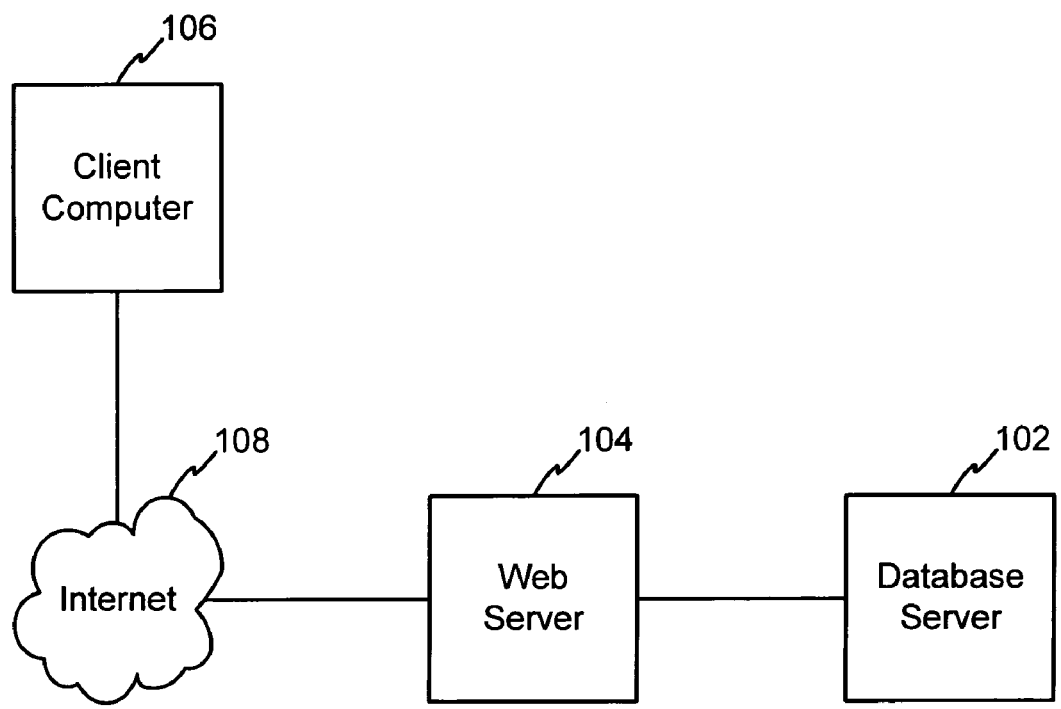
FIG. 1 presents a block diagram illustrating an exemplary system of the present invention.

With reference to FIG. 1, a block diagram illustrating an embodiment of the present invention is shown. Database Server 102 is the server computer that houses the database to be accessed globally. Web Server 104 is a web server that operates in a manner known in the art to direct users to the database server. Client computer 106 is a typical personal computer that can be used to access the Internet 108 using, e.g., a web browser such as Internet Explorer, Netscape Navigator, Opera, Mozilla, and the like.

When a user desires to access the database, the user uses a web browser on client computer 106 to access the Internet 108. Using the correct URL, the user is able to authenticate himself and access database server 102 through web server 104.

As described above, full-text searching is a feature that is very desirable. With such a feature, a user is able to search lengthy text, such as user manuals, court opinions, and the like, for desired phrases. However, such a process does not adequately function for files stored in proprietary binary formats, such as those by word processors such as Microsoft Office and WordPerfect, spreadsheets such as Microsoft Excel, presentation programs such as Microsoft PowerPoint, and document layout programs such as Adobe Acrobat. Because those types of files are stored in a binary format, it is not easy to search the contents of files created by those programs for text phrases.

Figure 2:
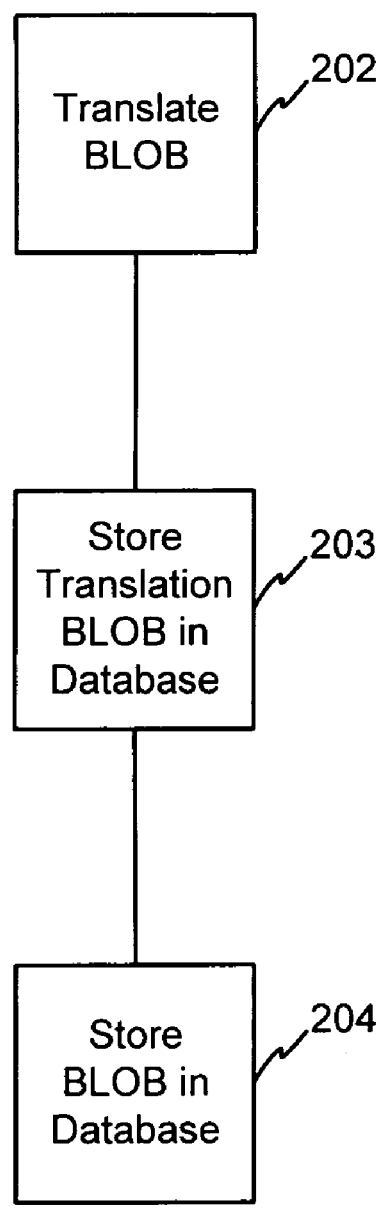
FIG. 2 presents a flowchart illustrating an exemplary method for the creation of a database record containing a binary file.

With reference to FIG. 2, a flow chart illustrating the creation of a full-text database record of the present embodiment is shown. As is known in the art, databases are typically organized into tables, where each table contains a variety of records organized into fields. A record is a set of related information, such as all information related to a customer. A field is a specific category of information. For example, contact information may contain a field for a name, a field for an address, and a field containing a telephone number.

Certain databases include the ability to contain a Character Large Object (CLOB), which is a large amount of text data. That text data can be queried, such that text phrases can be found within the CLOB. However, the database cannot contain a Binary Large Object (BLOB) file in the CLOB. Therefore, when attempting to load information into an embodiment of the present invention, if the format of the information includes a BLOB, the information is translated such that it only contains text information (step 202), and can thus be stored as a CLOB in the database (step 203). Such a translation step may occur in a variety of ways now known or developed in the future. For example, a translating program can be accessible by an embodiment of the present invention. The translating program may be preconfigured to be able to translate a variety of different files into text files. The BLOB is also stored in the database, such that the BLOB can be opened in its native format (step 204). By storing the BLOB in its native format in the database, the BLOB can be downloaded and opened in its native program by a user.

Figure 3:
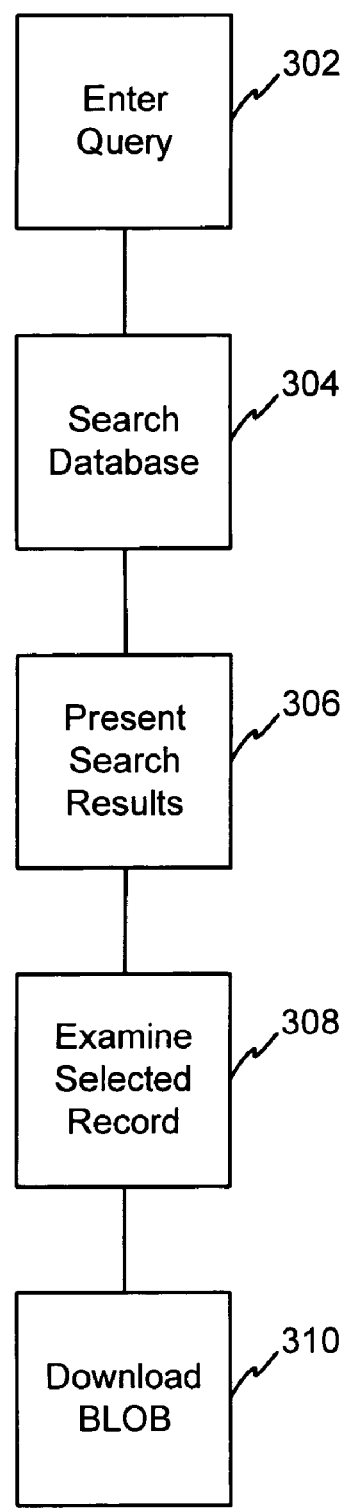
FIG. 3 presents a flowchart illustrating an exemplary method for searching a database.

With reference to FIG. 3, a flowchart illustrates the exemplary actions taken when a user searches a database that is set up as described above. If a user desires to perform a full-text search of the database, the CLOB is the field that is being searched. A user may start a full-text search in one of a variety of different manners. For example, there may be a drop-down box, push button, check-box, or other type of graphical control that can be used by the user to indicate that he wishes to perform a full-text search. If any other type of search is desired, the records are scanned in the typical manner known in the art. The user enters in his desired query (step 302). For example, the user may desire to search for documents regarding public-key encryption. Instead of merely searching the title of the documents, the user is able to search the text to find any document that contains the text "public-key encryption." The database is searched (step 304) and the user is presented with the search results (step 306). The results of the search may be presented in a variety of ways known in the art. In an embodiment of the present invention, the search results are in a format readable by a web browser. The search results may be placed in a table summarizing the results. In the alternative, search results may be formatted so that each returned result is on a single page.

The user then selects the record he wishes to view. The selection may occur in any number of different methods known in the art. For example, a user may be able to click (using a pointer controlled by a mouse) a push button or check box associated with the record noting that the user wishes to few a particular record.

The various fields of the selected record are then examined and parsed by an embodiment of the present invention (step 308). If there is information contained in the CLOB field, the BLOB field is checked to determine if it is empty. This comparison can be performed in a variety of manners. For example, a particular field can be compared to a NULL value. If the field is not equal to the NULL value, it is not empty. In the alternative, a database program may respond to a command that determines if a field is empty.

If the BLOB field contains data, an indication can be made to the user. For example, a text message can be displayed stating that there is a binary file available. Thereafter, the user can download the binary file stored in the BLOB field (step 310). The download may occur in a variety of manners known in the art. For example, the binary file may be placed at a specific location. Then a hyperlink to that location can be created and displayed to the user. Thereafter, a user can access the file by clicking on the hyperlink, triggering a download of the file in question.

The present invention is described herein with reference to block diagrams, flowchart illustrations of methods, systems, and computer program products according to various aspects of the invention. It will be understood that each functional block of the block diagrams and the flowchart illustrations, and combinations of functional blocks in block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create means for implementing the functions specified in the flowchart block or blocks.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded on a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The system may include a host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data, financial institution data and/or like data that could be used in association with the present invention. As those skilled in the art will appreciate, user computer will typically include an operating system (e.g., Windows NT, 95/98/2000, Linux, Solaris, etc.) as well as various conventional support software and drivers typically associated with computers. User computer can be in a home or business environment with access to a network. In an exemplary embodiment, access is through the Internet through a commercially-available web-browser software package.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In the foregoing specification, the invention has been described with reference to specific embodiments. However, it will be appreciated that various modifications and changes can be made without departing from the scope of the present invention. The specification and figures are to be regarded in an illustrative manner, rather than a restrictive one, and all such modifications are intended to be included within the scope of present invention.

Benefits, other advantages, and solutions to problems have been described above with regard to specific embodiments. No element described herein is required for the practice of the invention unless expressly described as "essential" or "critical."

We claim:

1. A method for facilitating a search of a database for binary content corresponding to a text string, said method comprising:

creating a record in said database;

storing said binary content within a binary large object field of said record, wherein said binary content does not contain searchable text and, wherein said binary content was created from text saved to a file of at least one of: a word processing program, a spreadsheet program, a presentation program, and a document layout program;

converting each binary set of said binary content directly into each corresponding ASCII value to form text content;

storing said text content within a character large object field of said record;

searching for said text string within said character large object field; and, downloading, from said database, said binary content to a computer based on said searching step.

2. The method of claim 1, wherein said converting step comprises:

determining a file format of said binary content; and, converting said binary content to said text content based on said file format.

3. The method of claim 1, wherein said converting step comprises:

determining a file format of said binary content; and, converting said binary content to said text content based on said file format by applying an algorithm according to said file format.

4. The method of claim 1, wherein said searching step comprises:

receiving search criteria, wherein said search criteria comprises said text string;

constructing a query based on said search criteria;

executing said query to locate data within said character large object field;

matching said search criteria to produce search results; and, retrieving said binary content from said binary large object field corresponding to said character large object field based on said search results.

5. The method of claim 4, further comprising parsing said binary content according to said search criteria.

6. The method of claim 1, wherein said searching step comprises searching for said text string via a browser application.

7. The method of claim 1, wherein said downloading step comprises:

saving said binary content to a file; and, providing a hyperlink to said file.

8. The method of claim 1, wherein said downloading step comprises downloading said binary content to said computer which is remote from said database.

* * * * *